(12) United States Patent
Jacobs

(10) Patent No.: US 9,624,706 B2
(45) Date of Patent: Apr. 18, 2017

(54) HINGE ASSEMBLY

(71) Applicant: Hewlett-Packard Development Company, L.P., Houston, TX (US)

(72) Inventor: Steven Jacobs, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/650,880

(22) PCT Filed: Dec. 17, 2012

(86) PCT No.: PCT/US2012/070087
§ 371 (c)(1),
(2) Date: Jun. 10, 2015

(87) PCT Pub. No.: WO2014/098792
PCT Pub. Date: Jun. 26, 2014

(65) Prior Publication Data
US 2015/0337579 A1    Nov. 26, 2015

(51) Int. Cl.
*G06F 1/16* (2006.01)
*H05K 5/00* (2006.01)
(Continued)

(52) U.S. Cl.
CPC .............. *E05D 11/082* (2013.01); *E05D 3/02* (2013.01); *E05D 11/0081* (2013.01); *E05D 11/084* (2013.01); *G06F 1/1616* (2013.01); *G06F 1/1681* (2013.01); *E05D 11/06* (2013.01); *E05Y 2900/606* (2013.01); *Y10T 16/522* (2015.01);
(Continued)

(58) Field of Classification Search
CPC ..... G06F 1/1616; G06F 1/1681; E05D 11/08; E05D 11/082; E05D 11/084; E05D 11/085
USPC .......... 361/679.26–679.29; 16/221, 337, 339, 16/342
See application file for complete search history.

(56) References Cited

U.S. PATENT DOCUMENTS 5,494,447 A    2/1996    Zaidan
5,832,566 A    11/1998    Quek et al.
(Continued)

FOREIGN PATENT DOCUMENTS

KR    10-2005-0005174 A    1/2005
TW    200912602 A    3/2009

OTHER PUBLICATIONS

International Search Report and Written Opinion, International Application No. PCT/US2012/070087, Date of Mailing: Sep. 4, 2013, pp. 1-7.

*Primary Examiner* — Anthony Haughton
(74) *Attorney, Agent, or Firm* — HP Patent Department

(57) ABSTRACT

A hinge assembly is disclosed herein. An example includes a first knuckle including a first wall that defines a first cavity and second knuckle including a second wall that defines a second cavity. The example also includes a friction element disposed in both the first cavity defined by the first wall of the first knuckle and the second cavity defined by the second wall of the second knuckle to both rotatably and resistively couple the first knuckle to the second knuckle by application of a force directed toward the first wall and the second wall, the friction element including a third wall that defines a third cavity. Modifications and additions to, as well as other examples of, the hinge assembly are also disclosed herein.

25 Claims, 6 Drawing Sheets

(51) Int. Cl.
*H05K 7/00* (2006.01)
*E05D 11/08* (2006.01)
*E05D 3/02* (2006.01)
*E05D 11/00* (2006.01)
*E05D 11/06* (2006.01)

(52) U.S. Cl.
CPC ........ *Y10T 16/538* (2015.01); *Y10T 16/53885* (2015.01); *Y10T 16/54034* (2015.01); *Y10T 16/54035* (2015.01); *Y10T 16/54038* (2015.01)

(56) References Cited

U.S. PATENT DOCUMENTS

| | | | |
|---|---|---|---|
| 6,078,496 A * | 6/2000 | Oguchi | G06F 1/1616 16/223 |
| 6,470,532 B2 | 10/2002 | Rude | |
| 7,089,628 B2 | 8/2006 | Lin et al. | |
| 8,245,355 B2 | 8/2012 | Wang et al. | |
| 8,250,709 B2 * | 8/2012 | Jou | F16M 11/06 16/330 |
| 8,254,103 B2 | 8/2012 | Park et al. | |
| 9,086,847 B2 * | 7/2015 | Filipovic | H04B 1/3888 |
| 9,182,794 B2 * | 11/2015 | Rivera | G06F 1/1681 |
| 2008/0078058 A1 | 4/2008 | Hsu et al. | |
| 2011/0099758 A1 | 5/2011 | Li et al. | |
| 2011/0154613 A1 | 6/2011 | Chang | |
| 2011/0216509 A1 * | 9/2011 | Mikami | H01R 4/64 361/730 |
| 2012/0011683 A9 | 1/2012 | Kim et al. | |

* cited by examiner

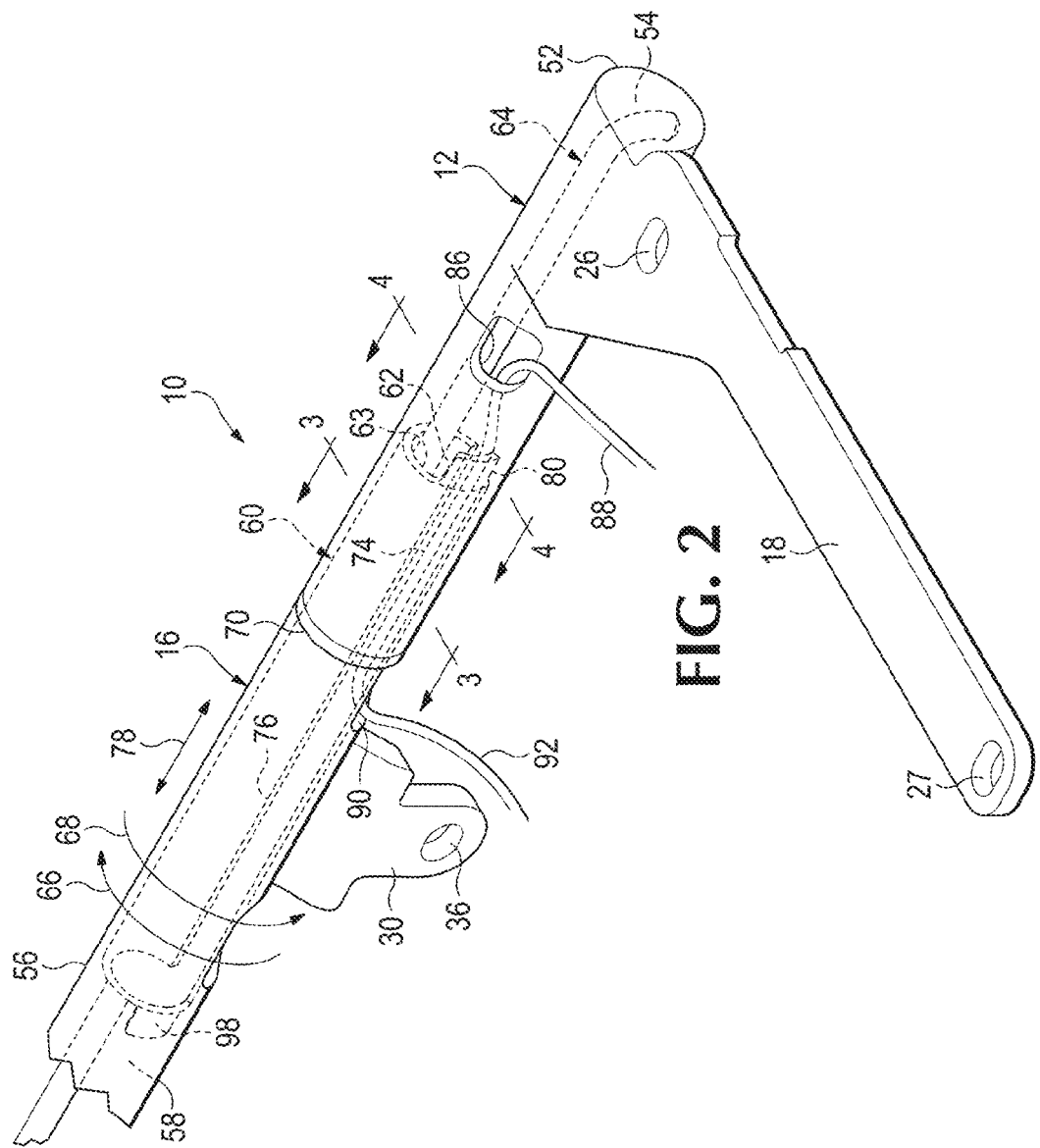
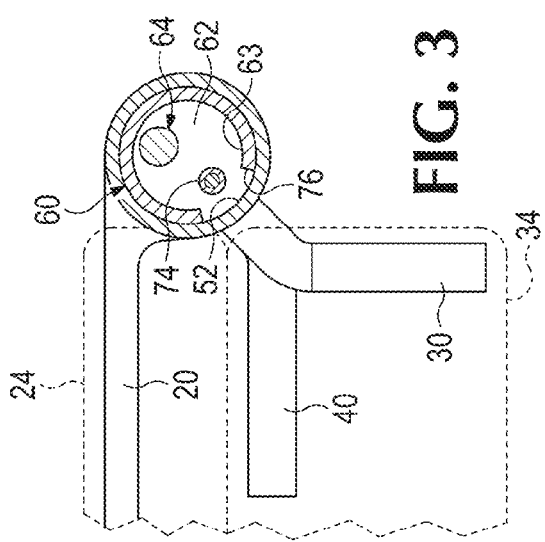
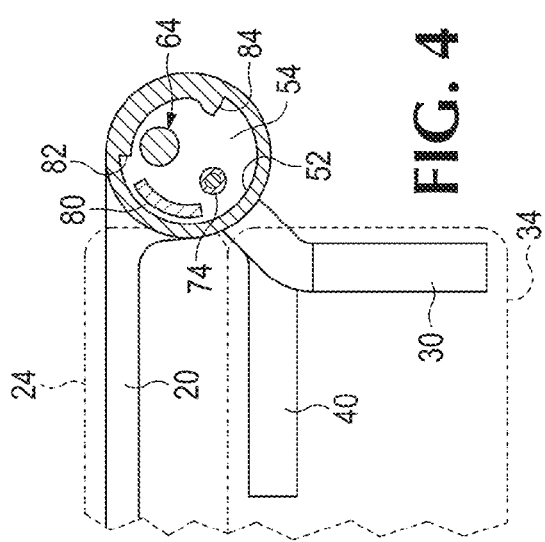
FIG. 2
FIG. 3
FIG. 4

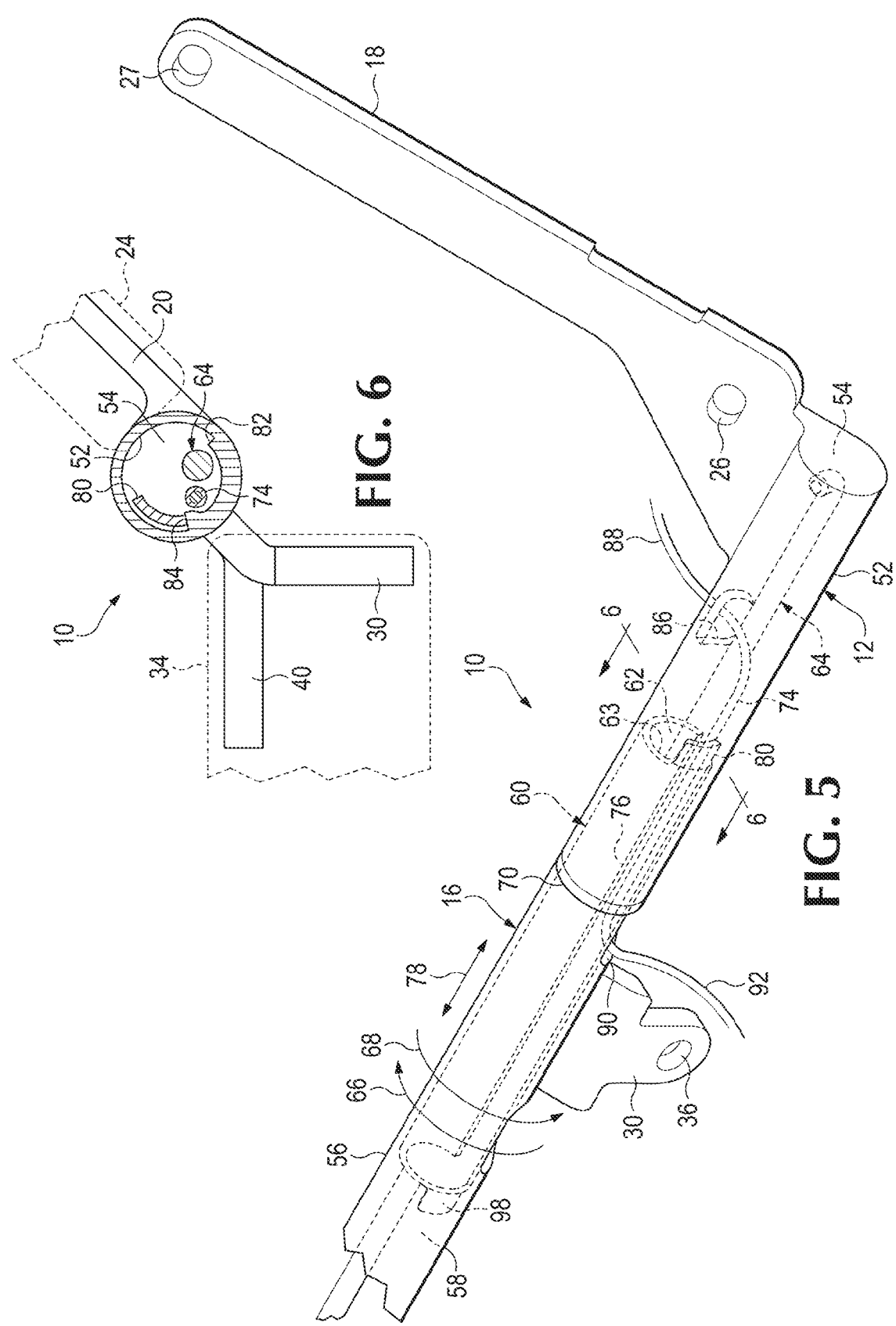

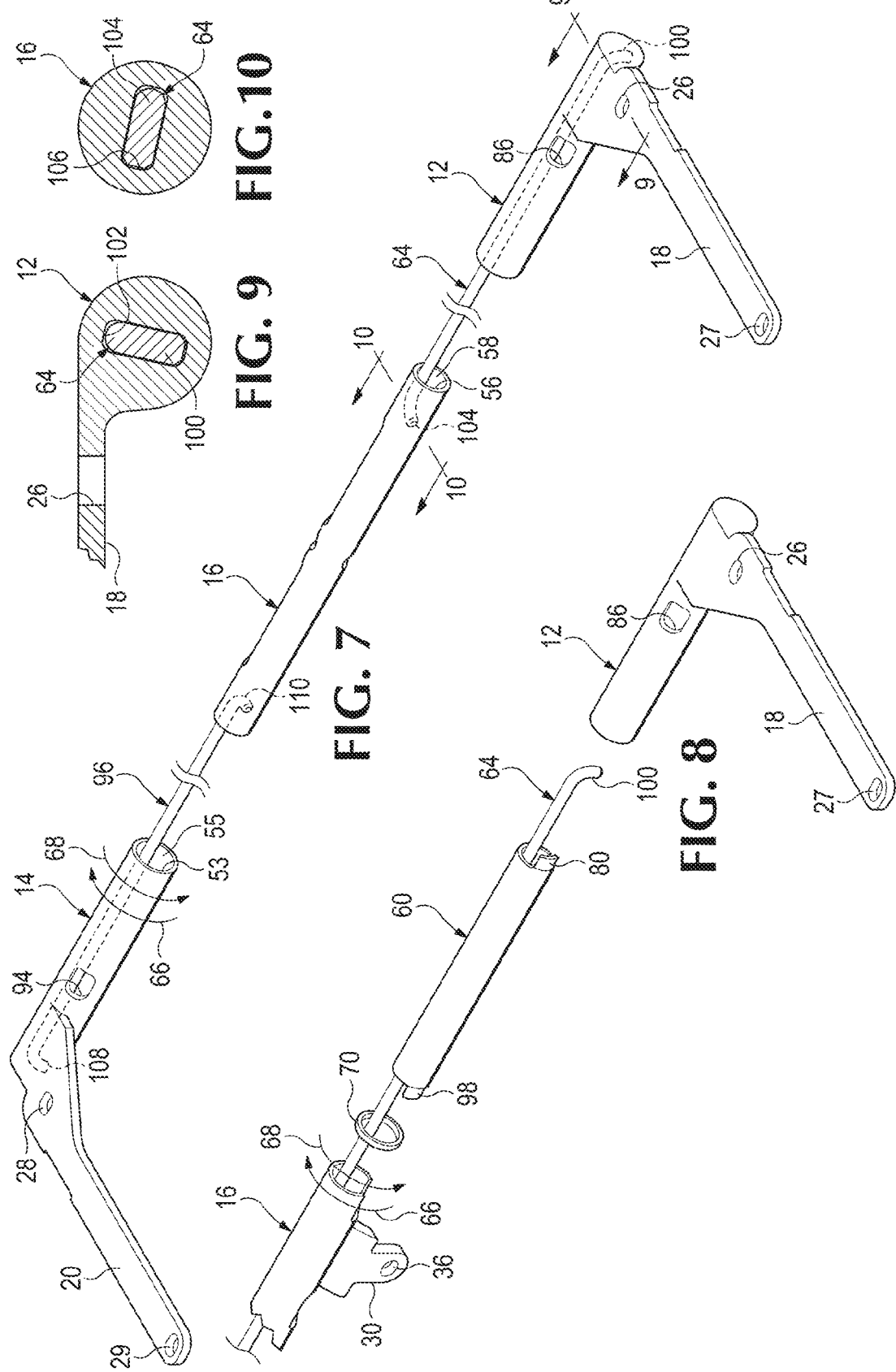

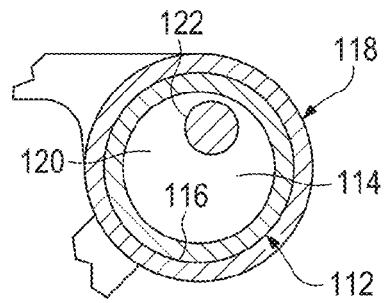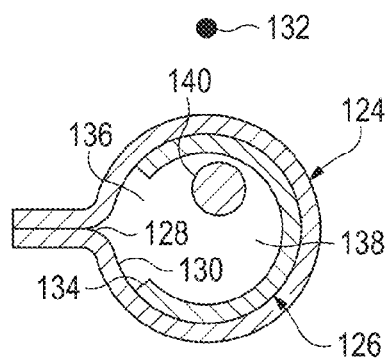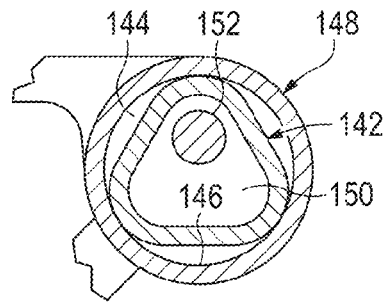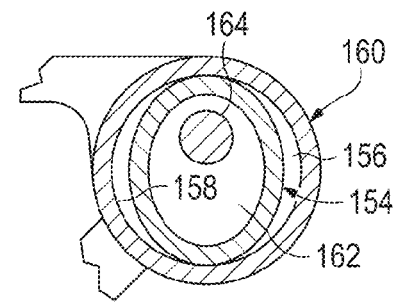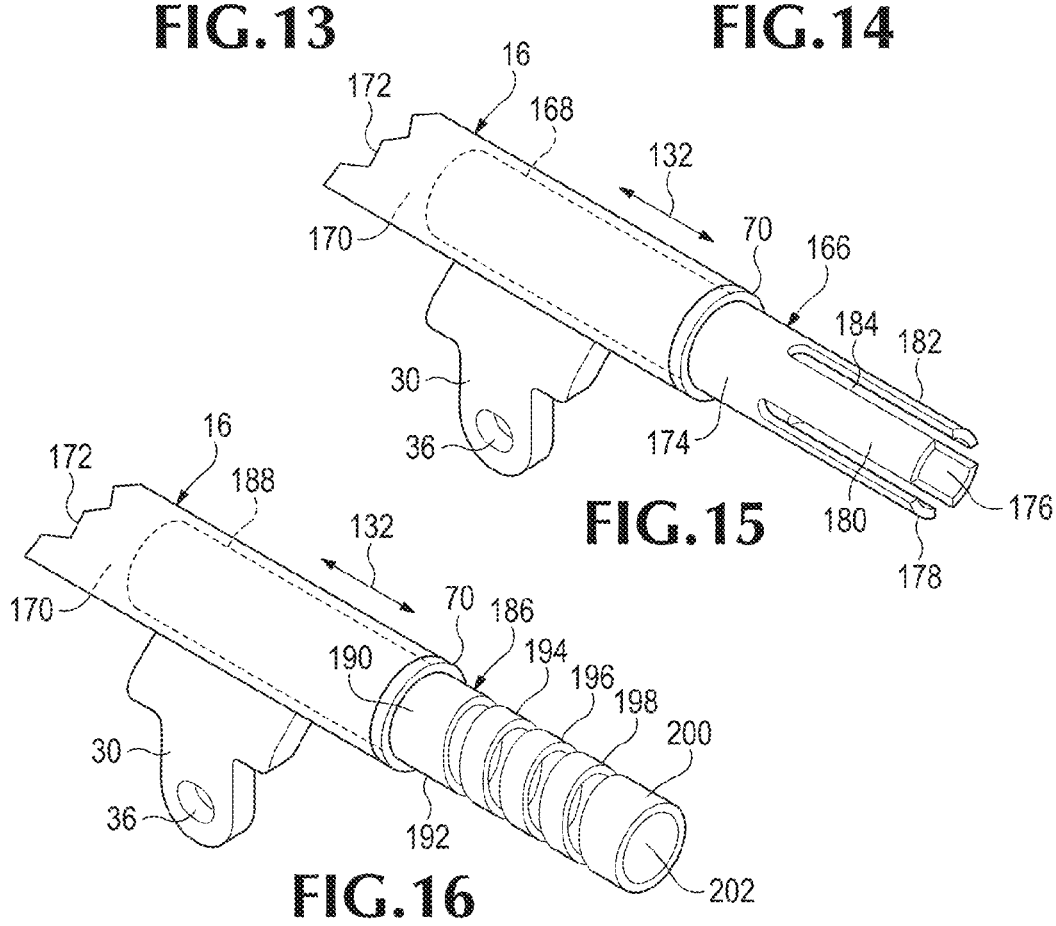

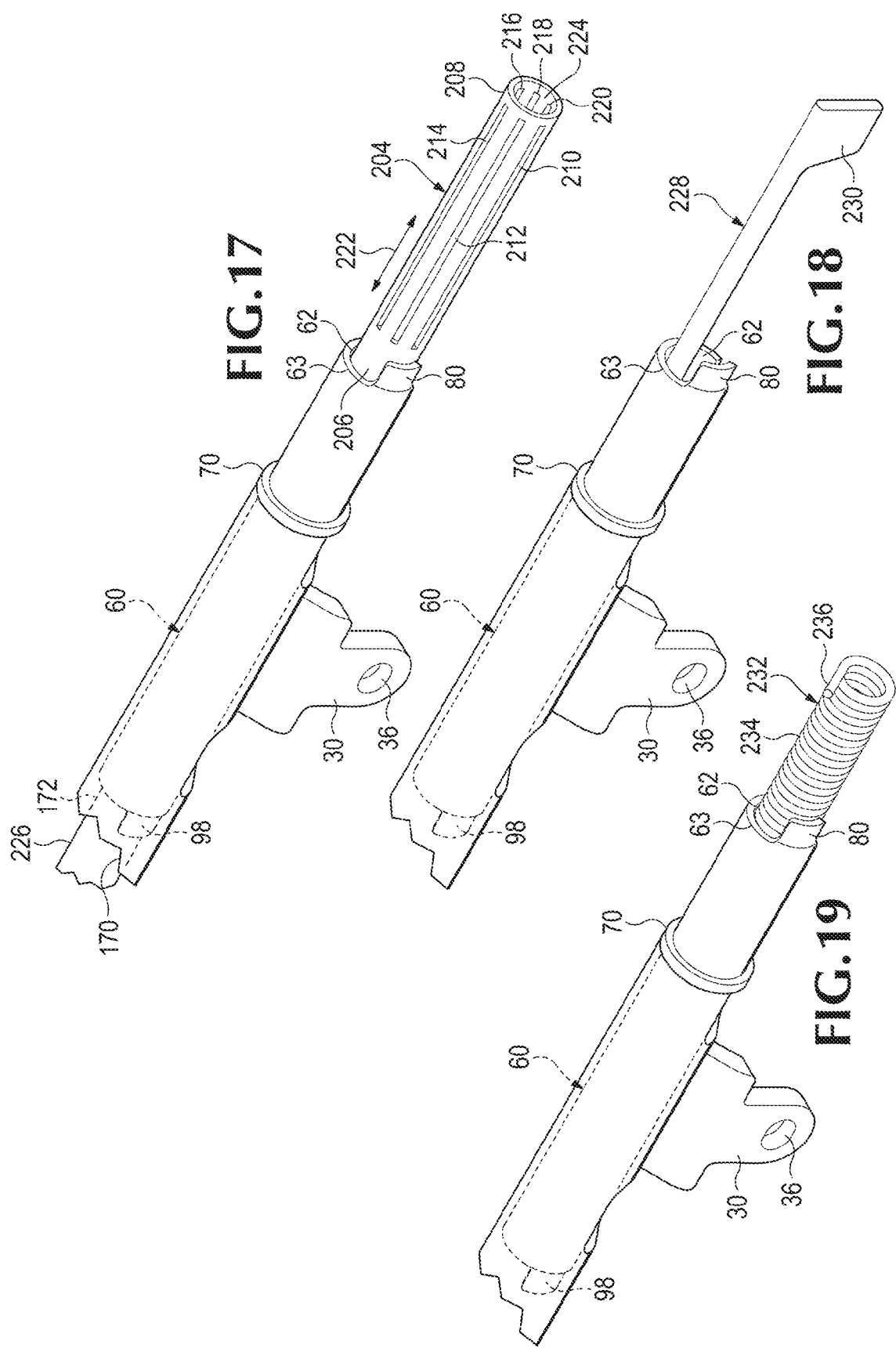

HINGE ASSEMBLY

BACKGROUND

Consumers appreciate aesthetically pleasing electronic devices. They also often appreciate electronic devices which have form-factors that are designed to help reduce size so that they may be more easily used, transported and/or stored. Business may, therefore, endeavor to create and provide such electronic devices to these consumers.

BRIEF DESCRIPTION OF THE DRAWINGS

The following detailed description references the drawings, wherein:

FIG. 2 is an example of an enlarged perspective view of a portion of the hinge assembly of FIG. 1.

FIG. 3 is a cross-sectional view taken along line 3-3 of FIG. 2.

FIG. 4 is a cross-sectional view taken along line 4-4 of FIG. 2.

FIG. 5 is another example of an enlarged perspective view of the portion of the hinge assembly of FIG. 2.

FIG. 6 is a cross-sectional view taken along line 6-6 of FIG. 5.

FIG. 7 is an example of an exploded perspective view of a portion of the hinge assembly of FIG. 1.

FIG. 8 is another example of an exploded perspective view of another portion of the hinge assembly of FIG. 1.

FIG. 9 is a cross-sectional view taken along line 9-9 of FIG. 7.

FIG. 10 is a cross-sectional view taken along line 10-10 of FIG. 7.

FIG. 11 is a cross-sectional view of an example of an alternative friction element that may be used in other examples of the hinge assembly of FIG. 1.

FIG. 12 is a cross-sectional view of an example of an alternative knuckle and friction element that may be used in other examples of the hinge assembly of FIG. 1.

FIG. 13 is a cross-sectional view of another example of an alternative friction element that may be used in other examples of the hinge assembly of FIG. 1.

FIG. 14 is a cross-sectional view of an additional example of an alternative friction element that may be used in other examples of the hinge assembly of FIG. 1.

FIG. 15 is a perspective view of a further example of an alternative friction element that may be used in other examples of the hinge assembly of FIG. 1.

FIG. 16 is a perspective view of yet a further example of an alternative friction element that may be used in other examples of the hinge assembly of FIG. 1.

FIG. 17 is a perspective view of an example of an alternative counterbalance member that may be used in other examples of the hinge assembly of FIG. 1.

FIG. 18 is a perspective view of another example of an alternative counterbalance member that may be used in other examples of the hinge assembly of FIG. 1.

FIG. 19 is a perspective view of a further example of an alternative counterbalance member that may be used in other examples of the hinge assembly of FIG. 1.

DETAILED DESCRIPTION

Figure 1:
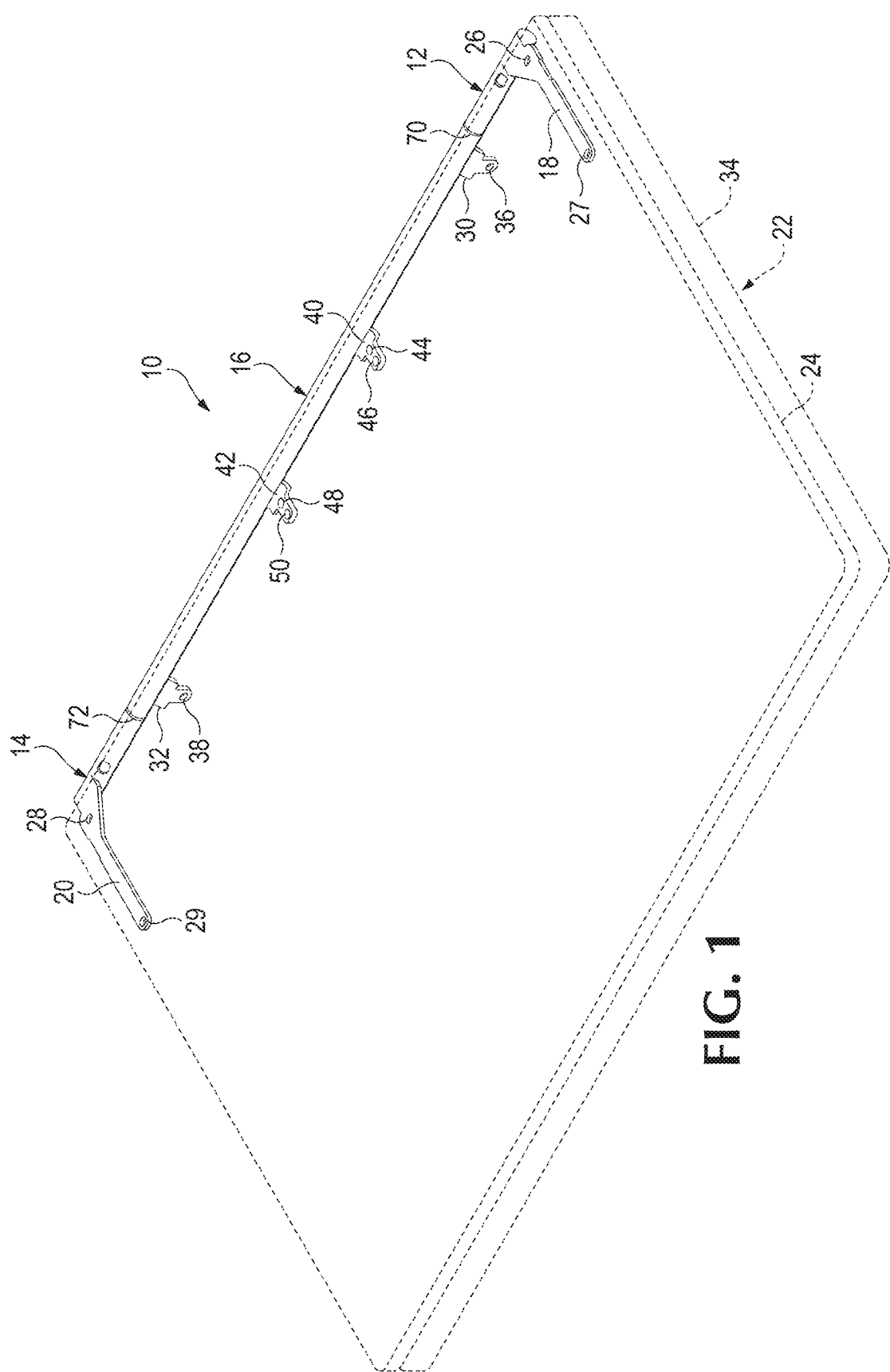
FIG. 1 is a perspective view of an example of a hinge assembly.

One or more hinges may be used on an electronic device for a variety applications or reasons. For example, a laptop computer or mobile phone may have a hinged cover or lid that includes a screen. The cover and screen may be moved from a closed position when not in use to an open position when in use that provides viewing of the screen and access to a keyboard or keypad. Another example is a hinged cover or lid that protects ports or connectors of an electronic device from dirt and debris in a closed position and provides access to such ports or connectors in an open position.

A perspective view of an example of a hinge assembly 10 is illustrated in FIG. 1. As can be seen in FIG. 1, hinge assembly 10 includes a pair of first knuckles 12 and 14 and a second knuckle 16. As can also be seen in FIG. 1, first knuckles 12 and 14 each include respective mounting members 18 and 20 for attachment to a structure or device such as electronic device 22. In this example, electronic device 22 is illustrated in outline as a laptop or mobile computer having a cover or lid 24 to which first knuckles 12 and 14 are attached via fasteners (not shown) that are disposed through openings 26 and 27, defined by mounting member 18, and openings 28 and 29, defined by mounting member 20, and into lid or cover 24.

It is to be understood that electronic device 22 is not part of hinge assembly 10 and is illustrated for exemplary purposes only. Hinge assembly 10 may be used with other types of electronic devices (e.g., mobile phones, personal digital assistants (PDAs), tablets, etc.). Hinge assembly 10 may also be used in other applications as well and is not intended to be limited in any way by the illustration of electronic device 22.

As can additionally be seen in FIG. 1, second knuckle 16 includes mounting members 30 and 32 for attachment to a structure or device such base 34 of electronic device 22. Second knuckle 16 is attached to base 34 of electronic device 22 via fasteners (not shown) that are disposed through openings 36 and 38 defined by respective mounting members 30 and 32 and into base 34. Second knuckle 16 also includes mounting members 40 and 42 for attachment to a structure or device, such as lid or cover 24, of electronic device 22. Second knuckle 16 is attached to cover or lid 24 of electronic device 22 via fasteners (not shown) that are disposed through openings 44 and 46 defined by mounting member 40 and into lid or cover 24, and also through openings 48 and 50 defined by mounting member 42 and into cover or lid 24.

Although not shown in FIG. 1, it is to be understood that other examples of hinge assembly 10 may utilize other techniques for attaching to electronic device 22 (e.g., adhesive) which may eliminate the need for openings 26, 27, 28, 29, 36, 38, 44, 46, 48, and 50, as well as the above-described fasteners (not shown). It is also to be understood that other examples of hinge assembly 10 may utilize a fewer or greater number of mounting members to attach or couple first knuckles 12 and 14 and second knuckle 16 to a device or structure. Additionally, in other examples of hinge assembly 10, the design of mounting members 18, 20, 30, 32, 40, and/or 42 may be different. It is to be additionally understood that other examples of hinge assembly 10 may utilize techniques or elements in addition to or other than mounting members 18, 20, 30, 32, 40, and 42 to attach or couple to a particular device or structure.

An example of an enlarged perspective view of a portion of hinge assembly 10 of FIG. 1 is shown in FIG. 2. As can be seen in FIG. 2, first knuckle 12 includes a first wall 52 that defines a first cavity 54. As can be seen, for example, in FIG. 7, first knuckle 14 also includes a first wall 53 that defines a first cavity 55, as well. Referring again to FIG. 2, second knuckle 16 includes a second wall 56 that defines a second cavity 58.

As can be seen in FIG. 2, hinge assembly 10 includes a friction element 60 that is disposed in first cavity 54 defined by first wall 52 of first knuckle 12 that expands or flexes toward first wall 52 to frictionally engage first wall 52 of first knuckle 12. Friction element 60 is also disposed in second cavity 58 defined by second wall 56 of second knuckle 16 to also expand or flex toward second wall 56 to frictionally engage second wall 56 of second knuckle 16. In this manner, first knuckle 12 is both rotatably and resistively coupled to second knuckle 16 by application of a force directed toward first wall 52 and second wall 56. Also in this manner, a third cavity 62 is defined by wall 63 of friction element 60 in which a counterbalance member 64 may be disposed. Counterbalance member 64 is coupled to first knuckle 12 and second knuckle 16, as discussed more fully below.

Although not shown in FIG. 2, it is to be understood that a friction element, like that of friction element 60, is disposed in first cavity 55 defined by first wall 53 of first knuckle 14 (see FIG. 7) and expands or flexes toward first wall 53 to frictionally engage first wall 53 of first knuckle 14. This friction element is also disposed in second cavity 58 defined by second wall 56 of second knuckle 16 to also expand or flex toward second wall 56 to frictionally engage second wall 56 of second knuckle 16. In this manner, first knuckle 14 is both rotatably and resistively coupled to second knuckle 16 by application of a force directed toward first wall 53 and second wall 56. Also in this manner, a third cavity (also not shown) is defined by a wall of this friction element in which counterbalance member 64 may be disposed.

Counterbalance member 64 provides a force that opposes rotation or movement of first knuckle 12 with respect to second knuckle 16 in a first direction, generally indicated by arrow 66. When hinge assembly 10 is utilized with electronic device 22, this helps maintain lid or cover 24 in a closed position against base 34. Counterbalance member 64 also provides a force that facilitates rotation or movement of first knuckle 12 with respect to second knuckle 16 in a second direction, generally indicated by arrow 68. When hinge assembly 10 is utilized with electronic device 22, this helps overcome the resistive force of friction element 60 holding lid or cover 24 open, allowing cover or lid 24 to be more easily moved from the open position shown, for example, in FIG. 6 to the closed position shown, for example, in FIG. 1. As can additionally be seen in FIG. 2, in this example, first direction 66 is generally opposite second direction 68. As can further be seen in FIG. 2, hinge assembly 10 includes a spacer 70 between first knuckle 12 and second knuckle 16. Spacer 70 acts as a bearing surface at the point where respective first and second knuckles 12 and 16 meet that helps to reduce friction during movement thereof in first direction 66 and second direction 68.

Although not shown in FIG. 2, it is to be understood that counterbalance member 64 also provides a force that opposes rotation or movement of first knuckle 14 with respect to second knuckle 16 in a first direction, generally indicated by arrow 66, as well as a force that facilitates rotation or movement of first knuckle 14 with respect to second knuckle 16 in a second direction, generally indicated by arrow 68. As can be seen, for example, in FIG. 1, hinge assembly 10 also includes a spacer 72 between first knuckle 14 and second knuckle 16. Spacer 72 acts as a bearing surface at the point where respective first and second knuckles 14 and 16 meet that helps to reduce friction during movement thereof in first direction 66 and second direction 68.

A cross-sectional view taken along line 3-3 of FIG. 2 is shown in FIG. 3. As can be seen in FIG. 3, third cavity 62 of friction element 60 defines a space in which a cable 74 is disposed. Although only a single cable 74 is illustrated as being disposed in cavity 62, it is to be understood that in other examples of hinge assembly 10, additional cables or items may be disposed therein. As can also be seen in FIG. 3, friction element 60 has a generally C-shaped cross-section that results from slot 76 in friction element 60 that extends substantially parallel to longitudinal axis 78.

A cross-sectional view taken along line 4-4 of FIG. 2 is shown in FIG. 4. As can be seen in FIG. 4, friction element 60 includes a tab or extending member 80 (also shown, for example in FIG. 2) that projects into first cavity 54 of first knuckle 12. As discussed more fully below, tab 80 is designed to limit a range of movement of hinge assembly 10 by preventing rotation of first knuckle 12 with respect to second knuckle 16 past the point where extending member 80 engages or contacts either stop 82 or stop 84 of first knuckle 12. In this particular illustrated example, this limits the extent to which cover or lid 24 of electronic device 22 may be moved from the closed position shown, for example, in FIGS. 3 and 4 to the open position shown, for example, in FIG. 6.

Referring again to FIG. 2, first knuckle 12 includes a slot 86 in communication with third cavity 62 of friction element 60 in which cable 74 is disposed. Slot 86 provides an opening through which end 88 of cable 74 is routed from third cavity 62 of friction element 60 and first cavity 54 of first knuckle 12. As can also be seen in FIG. 2, second knuckle 16 includes a slot 90 in communication with third cavity 62 of friction element 60 in which cable 74 is disposed. Slot 90 provides an opening through which end 92 of cable 74 is routed from third cavity 62 of friction element 60 and second cavity 58 of second knuckle 16. As shown, for example in FIG. 7, first knuckle 14 of hinge assembly 10 also includes a slot 94 in which an item or cable, such as cable 74, may be routed.

FIG. 5 is another example of an enlarged perspective view of the portion of hinge assembly 10 in a different position than that shown in FIG. 2. In this example, first knuckle 12 has been moved with respect to second knuckle 16 in the direction of arrow 66, from the position shown in FIG. 2 to the position shown in FIG. 6.

FIG. 6 is a cross-sectional view of hinge assembly 10 taken along line 6-6 of FIG. 5. As can be seen in FIG. 6, due to the movement of first knuckle 12 from the position shown in FIG. 2 to that shown in FIG. 5, tab or extending member 80 now contacts stop 84 preventing any such further movement of first knuckle 12 in the direction of arrow 66. In this example, this means that cover or lid 24 of electronic device 22 can be opened no further from base 34 than as shown in FIG. 6.

It should be noted that in other examples of hinge assembly 10, the extent, if any, to which movement of respective first and second knuckles 12 and 16 is restricted relative to one another may be varied by changing the locations of either or both of stops 82 and 84 of first knuckle 12. It is also to be noted that, although not shown, first knuckle 14 may also include one or more stops that restrict the relative movement of first knuckle 14 and second knuckle 16 with respect to one another.

An example of an exploded perspective view of a portion of hinge assembly 10 is shown in FIG. 7. As can be seen in FIG. 7, this example of hinge assembly 10 includes an additional counterbalance member 96. Counterbalance member 96 provides a force that opposes rotation or movement of first knuckle 14 with respect to second knuckle 16 in a first direction, generally indicated by arrow 66. Counterbalance member 96 also provides a force that facilitates rotation or movement of first knuckle 14 with respect to second knuckle 16 in a second direction, generally indicated by arrow 68.

Another example of an exploded perspective view of another portion of the hinge assembly 10 is shown in FIG. 8. As can be seen in FIG. 8, this example of friction element 60 of hinge assembly 10 includes an additional tab or extending member 98. Tab or extending member 98 operates in a similar fashion to that of tab or extending member 80 by contacting stops (not shown) within second knuckle 16 to further limit or restrict movement of first knuckle 12 with respect to second knuckle 16 in the directions of arrows 66 and/or 68, as discussed above in connection with stops 82 and 84.

FIG. 9 is a cross-sectional view taken along line 9-9 of FIG. 7. As can be seen in FIG. 9, counterbalance member 64 includes a first end 100 that is disposed in a cavity 102 of first knuckle 12 to couple counterbalance member 64 to first knuckle 12. FIG. 10 is a cross-section view taken along line 10-10 of FIG. 7. As can be seen in FIG. 10, counterbalance member 64 includes a second end 104 that is disposed in a cavity 106 of second knuckle 16 to couple counterbalance member 64 to second knuckle 16.

Referring again to FIG. 7, it can be seen that counterbalance member 96 also includes a first end 108 that is disposed in a cavity (not shown) of first knuckle 14 to couple counterbalance member 96 to first knuckle 14. As can also be seen in FIG. 7, counterbalance member 96 also includes a second end 110 that is disposed in cavity 58 of second knuckle 16 to couple counterbalance member 96 to second knuckle 16.

A cross-sectional view of an example of an alternative friction element 112 that may be used in other examples of hinge assembly 10 is illustrated in FIG. 11. As can be seen in FIG. 11, friction element 112 is disposed in a cavity 114 defined by wall 116 of knuckle 118. As can also be seen in FIG. 11, friction element 112 has a substantially circular cross-section and expands toward wall 116 of knuckle 118 to frictionally engage wall 116 of knuckle 118, as described above in connection with friction element 60. As can also be seen in FIG. 11, friction element 112 defines a cavity 120 in which a counterbalance member 122 may be disposed, as also described above. One or more wires or other items (not shown) may also be disposed in cavity 120, as additionally described above.

A cross-sectional view of an example of an alternative knuckle 124 and friction element 126 that may be used in other examples of hinge assembly 10 is illustrated in FIG. 12. As can be seen in FIG. 12, knuckle 124 includes a slot 128 in wall 130 of knuckle 124 that extends substantially parallel to a longitudinal axis 132 of knuckle 124 so that knuckle 124 has a generally c-shaped cross-section. As can also be seen in FIG. 12, friction element 126 includes a slot 134 that extends substantially parallel to longitudinal axis 132 so that friction element 126 also has a generally c-shaped cross-section. As can be seen in FIG. 12, friction element 126 is disposed in a cavity 136 defined by wall 130 of knuckle 124. Friction element 126 expands toward wall 130 of knuckle 124 to frictionally engage wall 130 of knuckle 124, as described above in connection with friction element 60. As can also be seen in FIG. 12, friction element 126 defines a cavity 138 in which a counterbalance member 140 may be disposed, as also described above. One or more wires or other items (not shown) may also be disposed in cavity 138, as additionally described above.

A cross-sectional view of an example of an alternative friction element 142 that may be used in other examples of hinge assembly 10 is illustrated in FIG. 13. As can be seen in FIG. 13, friction element 142 is disposed in a cavity 144 defined by wall 146 of knuckle 148. As can also be seen in FIG. 13, friction element 142 has a generally tri-lobed cross-section and expands toward wall 146 of knuckle 148 to frictionally engage wall 146 of knuckle 148, as described above in connection with friction element 60. As can also be seen in FIG. 13, friction element 142 defines a cavity 150 in which a counterbalance member 152 may be disposed, as also described above. One or more wires or other items (not shown) may also be disposed in cavity 150, as additionally described above.

A cross-sectional view of an example of another alternative friction element 154 that may be used in other examples of hinge assembly 10 is illustrated in FIG. 14. As can be seen in FIG. 14, friction element 154 is disposed in a cavity 156 defined by wall 158 of knuckle 160. As can also be seen in FIG. 14, friction element 154 has a substantially oval cross-section and expands toward wall 158 of knuckle 160 to frictionally engage wall 158 of knuckle 160, as described above in connection with friction element 60. As can also be seen in FIG. 14, friction element 154 defines a cavity 162 in which a counterbalance member 164 may be disposed, as also described above. One or more wires or other items (not shown) may also be disposed in cavity 162, as additionally described above.

A perspective view of a further example of a friction element 166 that may be used in other examples of hinge assembly 10 is illustrated in FIG. 15. As can be seen in FIG. 15, end 168 of friction element 166 is disposed in a cavity 170 defined by wall 172 of second knuckle 16. Similarly, end 174 of friction element 166 is disposed in a cavity defined by a wall of a first knuckle, none of which are shown in FIG. 15 for sake of clarity in explaining friction element 166. As can also be seen in FIG. 15, end 174 of friction element 166 includes a plurality of fingers 176, 178, 180, and 182 that extend substantially parallel to longitudinal axis 132, as shown. Fingers 176, 178, 180, and 182 of friction element 166 expand toward the wall of the first knuckle (such as, for example, wall 52 of first knuckle 12) to frictionally engage the wall of the first knuckle, as described above in connection with friction element 60. As can additionally be seen in FIG. 15, friction element 166 defines a cavity 184 in which a counterbalance member (not shown) may be disposed, as also described above, for example, in connection with counterbalance member 64. One or more wires or other items (also not shown) may also be disposed in cavity 184, as additionally described above.

Although not shown in FIG. 15, it is to be understood that end 168 of friction element 166 may include one or more fingers that expand toward wall 172 of second knuckle 16 to frictionally engage wall 172 of second knuckle 16. Also, it is to be understood, that in other examples of friction element 166, end 174 may include a different number of fingers (greater or lesser) than the four fingers 176, 178, 180, and 182 shown. Furthermore, it is to be understood, that in other examples of friction element 166, the shape and/or size of the fingers 176, 178, 180, and 182, as well as those on end 168, may be different than as illustrated in FIG. 15.

A perspective view of yet a further example of a friction element 186 that may be used in other examples of hinge assembly 10 is illustrated in FIG. 16. As can be seen in FIG. 16, end 188 of friction element 186 is disposed in a cavity 170 defined by wall 172 of second knuckle 16. Similarly, end 190 of friction element 186 is disposed in a cavity defined by a wall of a first knuckle, none of which are shown in FIG. 16 for sake of clarity in explaining the friction element 186. As can also be seen in FIG. 16, end 190 of friction element 186 is generally helical in shape having a plurality of spirals 192, 194, 196, 198, and 200 that extend substantially parallel to longitudinal axis 132, as shown. Spirals 192, 194, 196, 198, and 200 of friction element 186 expand toward the wall of the first knuckle (such as, for example, wall 52 of first knuckle 12) to frictionally engage the wall of the first knuckle, as described above in connection with friction element 60. As can additionally be seen in FIG. 16, friction element 186 defines a cavity 202 in which a counterbalance member (not shown) may be disposed, as also described above, for example, in connection with counterbalance member 64. One or more wires or other items (also not shown) may also be disposed in cavity 202, as additionally described above.

Although not shown in FIG. 16, it is to be understood that end 188 of friction element 186 may also be generally helical in shape and have one or more spirals that expand toward wall 172 of second knuckle 16 to frictionally engage wall 172 of second knuckle 16. Also, it is to be understood, that in other examples of friction element 186, end 192 may include a different number of spirals (greater or lesser) than the five spirals 192, 194, 196, 198, and 200 shown. Furthermore, it is to be understood, that in other examples of friction element 186, the shape and/or size of the spirals 192, 194, 196, 198, and 200, as well as those on end 188, may be different than as illustrated in FIG. 16.

A perspective view of an example of an alternative counterbalance member 204 that may be used in other examples of hinge assembly 10 is shown in FIG. 17. Counterbalance member 204 functions similarly to counterbalance member 64, as described above. As can be seen in FIG. 17, counterbalance member 204 is disposed in cavity 62 defined by wall 63 of friction element 60. As can also be seen in FIG. 17, end 206 of counterbalance member 204 includes an elastomeric tube 208 having a plurality of slits 210, 212, 214, 216, 218, and 220 that extend substantially parallel to a longitudinal axis 222 of tube 208, as shown. As can additionally be seen in FIG. 17, in this example, elastomeric tube 208 of counterbalance member 204 defines a cavity 224 in which one or more wires (not shown) or other items (also not shown) may also be disposed, as additionally described above.

Although not shown in FIG. 17, it is to be understood that end 226 of counterbalance member 204 may also include a plurality of slits that extend substantially parallel to a longitudinal axis 222 of tube 208. Also, it is to be understood, that in other examples of counterbalance member 204, end 206 may include a different number of slits (greater or lesser) than the six slits 210, 212, 214, 216, 218, and 220 shown. Furthermore, it is to be understood, that in other examples of counterbalance member 204, the shape and/or size of slits 210, 212, 214, 218, and 220, as well as those on end 226, may be different than as illustrated in FIG. 17.

A perspective view of another example of an alternative counterbalance member 228 that may be used in other examples of hinge assembly 10 is shown in FIG. 18. Counterbalance member 228 functions similarly to counterbalance member 64, as described above. As can be seen in FIG. 18, counterbalance member 228 is disposed in cavity 62 defined by wall 63 of friction element 60. As can also be seen in FIG. 18, first end 230 of counterbalance member 228 is swaged and, therefore, relatively flatter than first end 100, for example, of counterbalance member 64. Although not shown in FIG. 18, it is to be understood that an opposing second end of counterbalance member 228 may also swaged and, therefore, relatively flatter than second end 104, for example, of counter balance member 64.

A perspective view of further example of an alternative counterbalance member 232 that may be used in other examples of hinge assembly 10 is shown in FIG. 19. Counterbalance member 232 functions similarly to counterbalance member 64, as described above. As can be seen in FIG. 19, counterbalance member 232 includes a helical spring 234 disposed in cavity 62 defined by wall 63 of friction element 60. As can also be seen in FIG. 19, helical spring 234 includes a tab or projecting member 236 on one end for attachment to a first knuckle (not shown), such as first knuckle 12 or 14. Although not shown in FIG. 19, it is to be understood that helical spring 234 may also include an additional tab or projecting member on, for example, an opposing end for attachment to second knuckle 16 or friction element 60.

Although several examples have been described and illustrated in detail, it is to be clearly understood that the same are intended by way of illustration and example only. These examples are not intended to be exhaustive or to limit the invention to the precise form or to the exemplary embodiments disclosed. Modifications and variations may well be apparent to those of ordinary skill in the art. For example, although a pair of first knuckles 12 and 14, and a single second knuckle 16 have been illustrated in the example of hinge assembly 10, it is to be understood that the hinge assembly disclosed and claimed herein is not so limited. Other designs may include other combinations of first and second knuckles (e.g. a single first knuckle and a single second knuckle). As another example, the shape, design, and construction of first knuckles 12 and 14, as well as second knuckle 16, may be different than that shown and the hinge assembly claimed herein is not so limited. The spirit and scope of the present invention are to be limited only by the terms of the following claims.

Additionally, reference to an element in the singular is not intended to mean one and only one, unless explicitly so stated, but rather means one or more. Moreover, no element or component is intended to be dedicated to the public regardless of whether the element or component is explicitly recited in the following claims.

What is claimed is:
1. A hinge assembly, comprising:
a first knuckle including a wall that defines a cavity;
a friction element disposed in the cavity, wherein the friction element includes a plurality of fingers extending substantially parallel to a longitudinal axis of the friction element and the fingers of the friction element expanding toward the wall to frictionally engage the wall of the first knuckle;
a second knuckle coupled to the friction element so that the first knuckle is movable with respect to the second knuckle; and
a counterbalance member coupled to the first knuckle and the second knuckle to provide a force that both opposes movement of the first knuckle with respect to the second knuckle in a first direction and facilitates movement of the first knuckle with respect to the second knuckle in a second direction.

2. The hinge assembly of claim 1, wherein the friction element defines a space in which a cable is disposed and further comprising a cable slot in the first knuckle through which the cable is routed.

3. The hinge assembly of claim 2, further comprising an additional cable slot in the second knuckle through which the cable is routed.

4. The hinge assembly of claim 1, wherein the friction element frictionally engages the second knuckle.

5. The hinge assembly of claim 1, wherein the friction element includes a tab and the first knuckle includes a stop, and further wherein the tab engages the stop to limit a range of movement of the first knuckle with respect to the second knuckle.

6. The hinge assembly of claim 1, wherein the friction element includes a slot that extends substantially parallel to a longitudinal axis of the friction element so that the friction element has a generally c-shaped cross-section.

7. The hinge assembly of claim 1, wherein the friction element has one of a substantially circular cross-section, a substantially oval cross-section, and a generally tri-lobed cross-section.

8. The hinge assembly of claim 1, wherein the friction element is generally helical in shape.

9. The hinge assembly of claim 1, wherein the first knuckle includes a slot in the wall that extends substantially parallel to a longitudinal, axis of the first knuckle so that the first knuckle has a generally c-shaped cross-section, and further wherein the friction element includes a slot that extends substantially parallel to a longitudinal axis of the friction element so that the friction element has a generally c-shaped cross-section.

10. The hinge assembly of claim 1, wherein the counterbalance member includes one of a helical spring, a torsion bar, and an elastomeric tube.

11. The hinge assembly of claim 10, wherein the torsion bar is disposed in the cavity defined by the first knuckle.

12. The hinge assembly of claim 1, wherein the counterbalance member includes a tube having a plurality of slits extending substantially parallel to a longitudinal axis of the tube.

13. The hinge assembly of claim 1, further comprising an electronic device including a lid and a base, wherein the first knuckle is coupled to the lid and the second knuckle is coupled to the base.

14. A hinge assembly, comprising:
a first knuckle including a first wall that defines a first cavity;
a second knuckle including a second wall that defines a second cavity; and
a friction element disposed in both the first cavity defined by the first wall of the first knuckle and the second cavity defined by the second wall of the second knuckle to both rotatably and resistively couple the first knuckle to the second knuckle by application of a force directed toward the first wall and the second wall, the friction element including a third wall that defines a third cavity, wherein the friction element has a generally helical shape including a plurality of spirals extending substantially parallel to a longitudinal axis of the friction element and the spirals of the friction element expanding toward the first wall to frictionally engage the first wall of the first knuckle.

15. The hinge assembly of claim 14, further comprising a counterbalance member disposed in the third cavity defined by the third wall of the friction element to provide a force that both opposes rotation of the first knuckle with respect to the second knuckle in a first direction and facilitates rotation of the first knuckle with respect to the second knuckle in a second direction.

16. The hinge assembly of claim 15, wherein the counterbalance member includes one of a helical spring, a torsion bar, and an elastomeric tube.

17. The hinge assembly of claim 16, wherein the torsion bar includes a swaged end.

18. The hinge assembly of claim 14, wherein the first and second cavities concentrically surround the third cavity.

19. The hinge assembly of claim 14, further comprising a cable slot in the first knuckle in communication with the third cavity of the friction element.

20. The hinge assembly of claim 19, further comprising an additional cable slot in the second knuckle in communication with the third cavity.

21. The hinge assembly of claim 14, wherein the friction element includes a slot that extends substantially parallel to a longitudinal axis of the friction element so that the friction element has a generally c-shaped cross-section.

22. The hinge assembly of claim 14, wherein the friction element has one of a substantially circular cross-section, a substantially oval cross-section, and a generally tri-lobed cross-section.

23. The hinge assembly of claim 14, wherein the first knuckle includes a slot in the wall that extends substantially parallel to a longitudinal axis of the first knuckle so that the first knuckle has a generally c-shaped cross-section, and further wherein the friction element is includes a slot that extends substantially parallel to a longitudinal axis of the friction element so that the friction element has a generally c-shaped cross-section.

24. The hinge assembly of claim 14, wherein the friction element includes a plurality of fingers extending substantially parallel to a longitudinal axis of the friction element.

25. The hinge assembly of claim 14, further comprising an electronic device including a lid and a base, wherein the first knuckle is coupled to the lid and the second knuckle is coupled to the base.

\* \* \* \* \*

UNITED STATES PATENT AND TRADEMARK OFFICE
CERTIFICATE OF CORRECTION

PATENT NO.        : 9,624,706 B2                                    Page 1 of 1
APPLICATION NO.   : 14/650880
DATED             : April 18, 2017
INVENTOR(S)       : Steven Jacobs It is certified that error appears in the above-identified patent and that said Letters Patent is hereby corrected as shown below:

In the Claims

In Column 9, Line 27, in Claim 9, delete "longitudinal," and insert -- longitudinal --, therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*